(12) United States Patent
Meylan et al.

(10) Patent No.: US 7,872,981 B2
(45) Date of Patent: Jan. 18, 2011

(54) RATE SELECTION FOR EIGENSTEERING IN A MIMO COMMUNICATION SYSTEM

(75) Inventors: Arnaud Meylan, San Diego, CA (US); Santosh Abraham, San Diego, CA (US); Sanjiv Nanda, Ramona, CA (US)

(73) Assignee: Qualcomm Incorporated, San Diego, CA (US)

( * ) Notice: Subject to any disclaimer, the term of this patent is extended or adjusted under 35 U.S.C. 154(b) by 1434 days.

(21) Appl. No.: 11/128,843

(22) Filed: May 12, 2005

(65) Prior Publication Data

US 2006/0256761 A1 Nov. 16, 2006

(51) Int. Cl.
*G01R 31/08* (2006.01)
*H04W 4/00* (2009.01)
*H03B 1/02* (2006.01)
*H04B 17/00* (2006.01)

(52) U.S. Cl. .................. 370/252; 370/338; 455/101; 375/227

(58) Field of Classification Search .................. None
See application file for complete search history.

(56) References Cited

U.S. PATENT DOCUMENTS

| | | | |
|---|---|---|---|
| 6,131,016 A | 10/2000 | Greenstein et al. | |
| 6,137,840 A | 10/2000 | Tiedemann, Jr. et al. | |
| 6,141,567 A | 10/2000 | Youssefmir et al. | |
| 6,433,737 B2 | 8/2002 | Katz | |
| 6,771,706 B2* | 8/2004 | Ling et al. | 375/267 |
| 6,785,341 B2 | 8/2004 | Walton et al. | |
| 7,099,678 B2* | 8/2006 | Vaidyanathan | 455/500 |
| 7,508,748 B2* | 3/2009 | Kadous | 370/208 |
| 7,564,814 B2* | 7/2009 | Abraham et al. | 370/329 |
| 2004/0120411 A1* | 6/2004 | Walton et al. | 375/260 |

(Continued)

FOREIGN PATENT DOCUMENTS

KR 2000-0011799 2/2000

(Continued)

OTHER PUBLICATIONS

International Search Report and Written Opinion—PCT/US06/017962—International Search Authority, US—Aug. 8, 2007.

*Primary Examiner*—Nittaya Juntima
(74) *Attorney, Agent, or Firm*—Qualcomm Patent Group; Thien T. Nguyen; James Hunt Yancey, Jr.

(57) ABSTRACT

Techniques for selecting rates for data transmission on eigenmodes of a MIMO channel are described. An access point transmits an unsteered MIMO pilot via the downlink. A user terminal estimates the downlink channel quality based on the downlink unsteered MIMO pilot and transmits an unsteered MIMO pilot and feedback information via the uplink. The feedback information is indicative of the downlink channel quality. The access point estimates the uplink channel quality and obtains a channel response matrix based on the uplink unsteered MIMO pilot, decomposes the channel response matrix to obtain eigenvectors and channel gains for the eigenmodes of the downlink, and selects rates for the eigenmodes based on the estimated uplink channel quality, the channel gains for the eigenmodes, and the feedback information. The access point processes data based on the selected rates and transmits steered data and a steered MIMO pilot on the eigenmodes with the eigenvectors.

32 Claims, 6 Drawing Sheets

U.S. PATENT DOCUMENTS

| | | | |
|---|---|---|---|
| 2004/0136349 A1* | 7/2004 | Walton et al. | 370/338 |
| 2005/0249159 A1* | 11/2005 | Abraham et al. | 370/329 |
| 2006/0013250 A1* | 1/2006 | Howard et al. | 370/465 |
| 2006/0104340 A1* | 5/2006 | Walton et al. | 375/227 |

FOREIGN PATENT DOCUMENTS

| | | |
|---|---|---|
| KR | 2003-0093346 | 12/2003 |
| RU | 2193820 | 11/2002 |
| RU | 2238611 C1 | 10/2004 |
| RU | 2003135853 | 4/2005 |
| WO | WO2004002047 | 12/2003 |
| WO | WO2004038984 | 5/2004 |
| WO | WO2004038985 | 5/2004 |

* cited by examiner

RATE SELECTION FOR EIGENSTEERING IN A MIMO COMMUNICATION SYSTEM

BACKGROUND

1. Field

The present invention relates generally to communication, and more specifically to techniques for selecting rates for data transmission in a multiple-input multiple-output (MIMO) communication system.

2. Background

A MIMO system employs multiple (T) transmit antennas at a transmitting station and multiple (R) receive antennas at a receiving station for data transmission. A MIMO channel formed by the T transmit antennas and the R receive antennas may be decomposed into S spatial channels, where $S \leq \min\{T, R\}$. The S spatial channels may be used to transmit data in parallel to achieve higher throughput and/or redundantly to achieve greater reliability.

Each spatial channel may experience various deleterious channel conditions such as, e.g., fading, multipath, and interference effects. The S spatial channels may experience different channel conditions and may achieve different signal-to-noise-and-interference ratios (SNRs). The SNR of each spatial channel determines its transmission capacity, which is typically quantified by a particular data rate that may be reliably transmitted on the spatial channel.

Rate selection refers to the process of selecting suitable rates for data transmission, e.g., on the spatial channels of the MIMO channel. A "rate" may be associated with a particular data rate or information bit rate, a particular coding scheme or code rate, a particular modulation scheme, and so on to use for a data stream. For a time variant MIMO channel, the channel conditions change over time and the SNR of each spatial channel also changes over time. The different SNRs for different spatial channels plus the time varying nature of the SNR for each spatial channel make it challenging to select the proper rates for the spatial channels.

There is therefore a need in the art for techniques to select rates in a MIMO system.

SUMMARY

Techniques for selecting rates for data transmission on eigenmodes of a MIMO channel are described herein. An eigenmode may be viewed as an orthogonal spatial channel obtained by decomposing a channel response matrix for the MIMO channel. The techniques may be used for downlink data transmission from an access point (AP) to a user terminal (UT), uplink data transmission from the user terminal to the access point, and peer-to-peer data transmission between two user terminals.

According to an embodiment of the invention, an apparatus is described which includes a channel processor and a controller. The channel processor receives a pilot (e.g., an unsteered MIMO pilot) via a first communication link (e.g., the uplink) and derives a channel estimate for the first communication link. The controller receives feedback information indicative of the channel quality of a second communication link (e.g., the downlink) and selects rates for eigenmodes of the second communication link based on the feedback information and the channel estimate.

According to another embodiment, a method is provided in which a pilot is received via a first communication link. Feedback information indicative of the channel quality of a second communication link is also received. Rates for eigenmodes of the second communication link are selected based on the feedback information and the pilot.

According to yet another embodiment, an apparatus is described which includes means for receiving a pilot via a first communication link, means for receiving feedback information indicative of the channel quality of a second communication link, and means for selecting rates for eigenmodes of the second communication link based on the feedback information and the pilot.

According to yet another embodiment, a method is provided in which a first unsteered MIMO pilot is transmitted via the downlink. A second unsteered MIMO pilot and feedback information are received via the uplink. The feedback information is indicative of the downlink channel quality, which is estimated based on the first unsteered MIMO pilot. Rates for eigenmodes of the downlink are selected based on the feedback information and the second unsteered MIMO pilot.

According to yet another embodiment, an apparatus is described which includes a pilot processor, a controller, and a spatial processor. The pilot processor generates a pilot for transmission via a first communication link. The controller sends feedback information indicative of the channel quality of a second communication link. The spatial processor receives a data transmission on eigenmodes of the second communication link. The data transmission is sent at rates selected based on the pilot and the feedback information.

According to yet another embodiment, a method is provided in which a pilot is transmitted via a first communication link. Feedback information indicative of the channel quality of a second communication link is also sent. A data transmission, which is sent at rates selected based on the pilot and the feedback information, is received on eigenmodes of the second communication link.

According to yet another embodiment, an apparatus is described which includes means for transmitting a pilot via a first communication link, means for sending feedback information indicative of the channel quality of a second communication link, and means for receiving a data transmission on eigenmodes of the second communication link. The data transmission is sent at rates selected based on the pilot and the feedback information.

Various aspects and embodiments of the invention are described in detail below.

DETAILED DESCRIPTION

Figure 1:
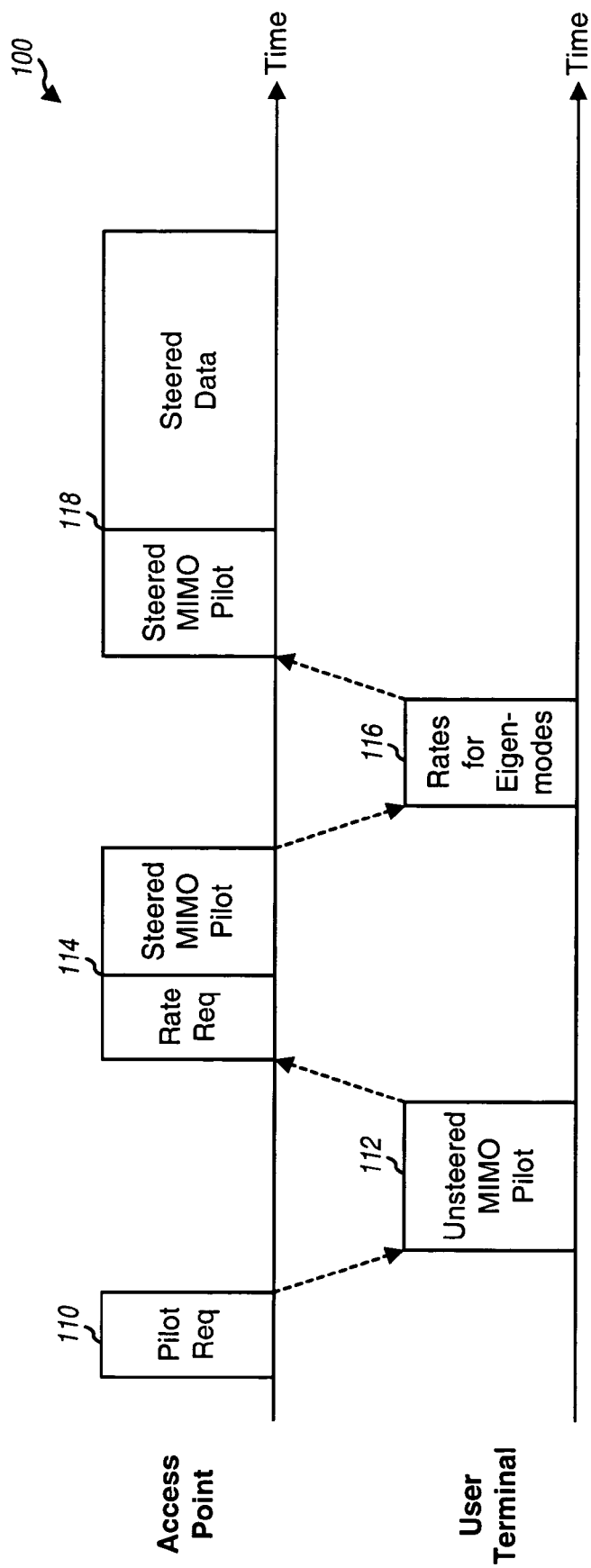
FIG. 1 shows a scheme for AP-initiated data transmission on eigenmodes.

The word "exemplary" is used herein to mean "serving as an example, instance, or illustration." Any embodiment described herein as "exemplary" is not necessarily to be construed as preferred or advantageous over other embodiments.

The rate selection techniques described herein may be used for data transmission on the downlink and uplink. The downlink (or forward link) refers to the communication link from an access point to a user terminal, and the uplink (or reverse link) refers to the communication link from the user terminal to the access point. For clarity, much of the following description is for downlink data transmission from the access point to the user terminal. An access point may also be called a base station, a base transceiver station, and so on. A user terminal may also be called a mobile station, a user equipment, a wireless device, and so on.

A downlink MIMO channel formed by T antennas at the access point and R antennas at the user terminal may be characterized by an R×T channel response matrix H, which may be expressed as:

$$H = \begin{bmatrix} h_{1,1} & h_{1,2} & \cdots & h_{1,T} \\ h_{2,1} & h_{2,2} & \cdots & h_{2,T} \\ \vdots & \vdots & \ddots & \vdots \\ h_{R,1} & h_{R,2} & \cdots & h_{R,T} \end{bmatrix},$$   Eq (1)

where entry $h_{i,j}$, for $i=1, \ldots, R$ and $j=1, \ldots, T$, is the coupling or complex gain between AP antenna j and UT antenna i. For simplicity, the MIMO channel is assumed to be flat fading, and the coupling between each pair of AP and UT antennas is represented with a single complex gain $h_{i,j}$.

The channel response matrix H may be diagonalized to obtain S eigenmodes or orthogonal spatial channels of the downlink MIMO channel. This diagonalization may be achieved by performing either singular value decomposition of H or eigenvalue decomposition of a correlation matrix of H, which is $R=H^H H$, where $H^H$ denotes the conjugate transpose of H. For clarity, singular value decomposition is used in the following description. The singular value decomposition of H may be expressed as:

$$H = U \cdot \Sigma \cdot V^H,$$   Eq (2)

where U is an R x R unitary matrix of left eigenvectors of H;
Σ is an R×T diagonal matrix of singular values of H; and
V is a T×T unitary matrix of right eigenvectors of H.

A unitary matrix Q is characterized by the property $Q^H Q = I$, where I is the identity matrix. The columns of a unitary matrix are orthogonal to one another, and each column has unit power. The right eigenvectors in V may be used for spatial processing to transmit data on the eigenmodes of H. The left eigenvectors in U may be used for receiver spatial processing to recover the data transmission sent on the eigenmodes of H. The diagonal matrix Σ contains non-negative real values along the diagonal and zeros elsewhere. These diagonal entries are referred to as singular values of H and represent the channel gains for the eigenmodes. Singular value decomposition is described by Gilbert Strang in "Linear Algebra and Its Applications," Second Edition, Academic Press, 1980.

The access point performs spatial processing for eigensteering as follows:

$$x = V \cdot s,$$   Eq(3)

where s is a vector with up to S data symbols to be sent on the S eigenmodes; and
x is a vector with T transmit symbols to be sent from the T AP antennas.

Eigensteering refers to transmission of data on eigenmodes of a MIMO channel.

As used herein, a "data symbol" is a modulation symbol for data, a "pilot symbol" is a modulation symbol for pilot, a "transmit symbol" is a symbol to be sent from a transmit antenna, a "received symbol" is a symbol obtained from a receive antenna, and a symbol is a complex value. A pilot is a transmission that is known a priori by both the transmitting and receiving stations. A pilot may also be referred to as sounding, training, a reference transmission, a preamble, and so on. For clarity, the following description assumes that one data stream is sent on each eigenmode.

The received symbols at the user terminal may be expressed as:

$$r = H \cdot x + n = H \cdot V \cdot s + n = H_{eff} \cdot s + n,$$   Eq(4)

where r is a vector with R received symbols from the R UT antennas;
$H_{eff} = H \cdot V$ is an effective MIMO channel response matrix for vector s; and
n is a noise vector.

For simplicity, the noise is assumed to be additive white Gaussian noise (AWGN) with a zero mean vector and a covariance matrix of $\phi_{nn} = \sigma_{noise}^2 \cdot I$, where $\sigma_{noise}^2$ is the variance of the noise. The user terminal may recover the transmitted data symbols using various receiver spatial processing techniques such as a full-CSI technique, a minimum mean square error (MMSE) technique, and a zero-forcing (ZF) technique.

The user terminal may derive a spatial filter matrix based on the full-CSI, MMSE, or zero-forcing technique, as follows:

$$M_{fcsi} = \Sigma^{-1} \cdot U^H = H_{eff}^H,$$   Eq (5)

$$M_{mmse} = D_{mmse} \cdot [H_{eff}^H \cdot H_{eff} + \sigma_{noise}^2 \cdot I]^{-1} \cdot H_{eff}^H,$$   Eq (6)

$$M_{zf} = [H_{eff}^H \cdot H_{eff}]^{-1} \cdot H_{eff}^H = R_{eff}^{-1} \cdot H_{eff}^H,$$   Eq (7)

where $D_{mmse} = \text{diag}\{[H_{eff}^H \cdot H_{eff} + \sigma_{noise}^2 \cdot I]^{-1} \cdot H_{eff}^H \cdot H_{eff}\}^{-1}$, The user terminal may perform receiver spatial processing as follows:

$$\hat{s} = M \cdot r = s + \tilde{n},$$   Eq (8)

where M is a spatial filter matrix, which may be equal to $M_{fcsi}$, $M_{mmse}$ or $M_{zf}$;
$\hat{s}$ is a vector with up to S detected data symbols; and
$\tilde{n}$ is the noise after the receiver spatial processing.

The detected data symbols in $\hat{s}$ are estimates of the transmitted data symbols in s.

The SNR of each eigenmode m, for $m=1, \ldots, S$, may be expressed as:

$$SNR_{fcsi,m} = 10\log_{10}\left(\frac{P_m \cdot \sigma_m^2}{\sigma_{noise}^2}\right),$$   Eq (9)

$$SNR_{mmse,m} = 10\log_{10}\left(\frac{q_m}{1-q_m} \cdot P_m\right),$$   Eq (10)

$$SNR_{zf,m} = 10\log_{10}\left(\frac{P_m}{r_m \cdot \sigma_{noise}^2}\right),$$   Eq (11)

where $P_m$ is the transmit power used for eigenmode m;
$\sigma_m$ is the singular value for eigenmode m, which is the m-th diagonal element of Σ;
$q_m$ is the m-th diagonal element of $D_{mmse}^{-1}$; and
$r_m$ is the m-th diagonal element of $R_{eff}^{-1}$.

$SNR_{fcsi,m}$, $SNR_{mmse,m}$, and $SNR_{zf,m}$ are the SNR of eigenmode m for the full-CSI, MMSE, and zero-forcing techniques, respectively, and are in units of decibel (dB). The term $P_m/\sigma_{noise}^2$ is often referred to as the received SNR. The terms $SNR_{fcsi,m}$, $SNR_{mmse,m}$, and $SNR_{zf,m}$ are often referred to as the post-detection SNRs, which are the SNRs after the receiver spatial processing.

The rates for the eigenmodes may be selected based on the SNRs of these eigenmodes. The rate selection is dependent on the rate selection scheme supported by the system. In one rate selection scheme, the system allows a rate to be independently selected for each eigenmode based on the SNR of that eigenmode. The system may support a set of rates, and each supported rate may be associated with a particular minimum SNR required to achieve a specified level of performance, e.g., 1% packet error rate (PER). The required SNR for each supported rate may be obtained by computer simulation, empirical measurements, and so on. The set of supported rates and their required SNRs may be stored in a look-up table. The SNR of each eigenmode, $SNR_m$, may be compared against the required SNRs for the supported rates to determine the highest rate $R_m$ supported by that $SNR_m$. The rate $R_m$ selected for each eigenmode is associated with the highest data rate and a required SNR that is less than or equal to $SNR_m$, or $SNR_{req}(R_m) \leq SNR_m$.

In another rate selection scheme, the system allows only certain combinations of rates to be used for data transmission. The set of rate combinations allowed by the system is often called a vector-quantized rate set. A rate combination may also be called a modulation coding scheme (MCS) or some other terminology. Each allowed rate combination is associated with a specific number of data streams to transmit, a specific rate for each data stream, and an overall throughput for all of the data streams. The SNRs of the eigenmodes may be used to select one of the allowed rate combinations.

The access point uses the following information to transmit data on the eigenmodes of the downlink MIMO channel:

a set of right eigenvectors in V; and a set of rates for data streams sent on the eigenmodes.

Different rates may be used for different eigenmodes since these eigenmodes may achieve different SNRs. The access point may obtain the eigenvectors and the rates for the eigenmodes in various manners.

In a time division duplex (TDD) system, the downlink and uplink share the same frequency band, and the downlink and uplink channel responses may be assumed to be reciprocal of one another. That is, if H is the channel response matrix from antenna array X to antenna array Y, then a reciprocal channel implies that the coupling from array Y to array X is given by $H^T$, where $H^T$ denotes the transpose of H. However, the responses of the transmit and receive chains at the access point are typically different from the responses of the transmit and receive chains at the user terminal. Calibration may be performed to derive correction matrices that can account for differences in the responses of the transmit/receive chains at the two stations. The application of the correction matrices at these two stations allows a calibrated channel response for one link to be expressed as a transpose of a calibrated channel response for the other link. For simplicity, the following description assumes a flat frequency response for the transmit/receive chains. The downlink channel response matrix is $H_{dl}=H$, and the uplink channel response matrix is $H_{ul}=H^T$.

The singular value decomposition of $H_{dl}$ and $H_{ul}$ may be expressed as:

$$H_{dl}=U\cdot\Sigma\cdot V^H \text{ and } H_{ul}=V^*\cdot\Sigma^T\cdot U^T, \quad \text{Eq (12)}$$

where V* is a complex conjugate of V. As shown in equation (12), U and V are matrices of left and right eigenvectors of $H_{dl}$, and V* and U* are matrices of left and right eigenvectors of $H_{ul}$.

The access point performs spatial processing with V to transmit data on eigenmodes to the user terminal. The user terminal performs receiver spatial processing with $U^H$ (or H and V) to recover the downlink data transmission. One station may transmit an unsteered MIMO pilot that may be used by the other station to obtain an estimate of H. An unsteered MIMO pilot is a pilot comprised of N pilot transmissions sent from N antennas, where the pilot transmission from each antenna is identifiable by the receiving station. N=T for a downlink unsteered MIMO pilot sent by the access point, and N=R for an uplink unsteered MIMO pilot sent by the user terminal. The transmitting station may orthogonalize the N pilot transmissions in (1) code domain by using a different orthogonal sequence (e.g., Walsh sequence) for each pilot transmission, (2) frequency domain by sending each pilot transmission on a different frequency subband, or (3) time domain by sending each pilot transmission in a different time interval. In any case, the receiving station is able to obtain an estimate of H based on the unsteered MIMO pilot received from the transmitting station. For simplicity, the following description assumes no errors in channel estimation.

Singular value decomposition is computationally intensive. Thus, it may be desirable to have the access point perform singular value decomposition of H to obtain the eigenvectors in V. The access point may then transmit a steered MIMO pilot, which is a pilot sent on the eigenmodes of the MIMO channel. The steered MIMO pilot may be generated as follows:

$$x_{pilot,m}=v_m \cdot p_m, \quad \text{Eq (13)}$$

where $v_m$ is the right eigenvector for eigenmode m, which is the m-th column of V;

$p_m$ is a pilot symbol transmitted on eigenmode m; and $x_{pilot,m}$ is a transmit vector for the steered MIMO pilot for eigenmode m.

The access point may transmit a complete steered MIMO pilot on all eigenmodes in one or multiple (consecutive or non-consecutive) symbol periods.

The received steered MIMO pilot at the user terminal may be expressed as:

$$r_{pilot,m}=H\cdot x_{pilot,m}+n=U\cdot\Sigma\cdot V^H\cdot v_m\cdot p_m+n=u_m\cdot\sigma_m\cdot p_m+n, \quad \text{Eq (14)}$$

where $r_{pilot,m}$ is a received vector for the steered MIMO pilot for eigenmode m; and $u_m$ is the left eigenvector for eigenmode m, which is the m-th column of U.

Equation (14) indicates that the user terminal may obtain (1) an estimate of U, one column at a time, and (2) an estimate of $\Sigma$, one singular value $\sigma_m$ at a time, based on the steered MIMO pilot from the access point. The user terminal can obtain estimates of the eigenvectors and the singular values without having to perform singular value decomposition.

The user terminal typically selects the rates for the eigenmodes of the downlink MIMO channel and sends the selected rates back to the access point. The access point typically cannot select the rates for the downlink MIMO channel based solely on an uplink MIMO pilot from the user terminal because of various factors such as, e.g., (1) different receiver noise levels at the access point and the user terminal, (2) different interference levels observed by the access point and the user terminal, and/or (3) different transmit powers used for uplink MIMO pilot and downlink data transmission.

FIG. 1 shows an exemplary pilot and data transmission scheme 100 to transmit data on eigenmodes of the downlink MIMO channel. The timeline for the access point and the timeline for the user terminal are not necessarily drawn to scale in FIG. 1.

Initially, the access point sends to the user terminal a request for a pilot, which may be called a pilot request (Pilot Req) or a training request (TRQ) (block 110). The user terminal receives the pilot request and, in response, transmits an unsteered MIMO pilot in a sounding packet (block 112). The access point receives the unsteered MIMO pilot, estimates the channel response matrix H, and decomposes H to obtain eigenvectors. The access point then transmits a steered MIMO pilot and a request for rate feedback, which may be called a rate request (Rate Req) or an MCS request (MRQ) (block 114). The user terminal receives the steered MIMO pilot, estimates the SNR of each eigenmode based on the steered MIMO pilot, and selects rates for the eigenmodes based on the SNRs of the eigenmodes. The user terminal then sends back the selected rates for the eigenmodes (block 116). The access point receives the selected rates from the user terminal, processes (e.g., encodes and modulates) data based on the selected rates, and spatially processes the data based on the eigenvectors. The access point then transmits a steered MIMO pilot and steered data to the user terminal (block 118).

Transmission scheme 100 allows the access point to transmit data at the proper rates on the eigenmodes of H without the need for the user terminal to perform singular value decomposition. However, four overhead transmissions are needed for blocks 110 through 116 in order to transmit data with eigensteering in block 118. The four overhead transmissions may wipe out the gain in higher overall throughput achieved with eigensteering. As an example, for a system in which the four overhead transmissions require 264 microseconds (μs), when the raw data rate with eigensteering is assumed to be 140 Mbps, and the raw data rate without eigensteering is assumed to be 33% lower, the payload size should exceed 8 kilobytes in order to amortize the overhead for eigensteering. For smaller payload sizes, performance is better without eigensteering because of lower overhead.

Figure 2:
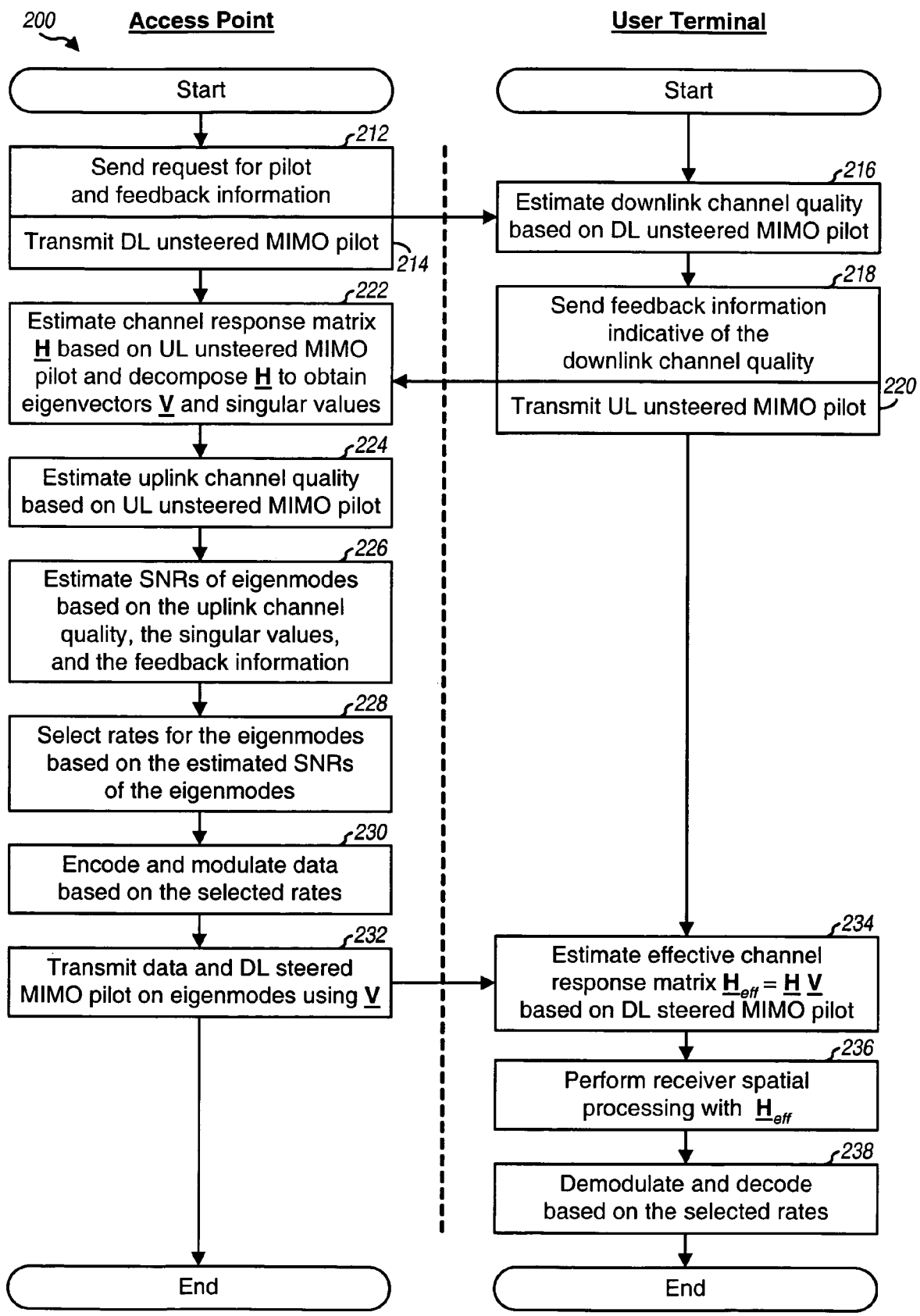
FIG. 2 shows a process for transmitting data on eigenmodes with low overhead.

FIG. 2 shows a process 200 for transmitting data on eigenmodes of the downlink MIMO channel with low overhead. Initially, the access point sends a request for pilot and feedback information, e.g., TRQ and MRQ (block 212). The access point also transmits a downlink (DL) unsteered MIMO pilot, e.g., along with the request for pilot and feedback information (block 214).

The user terminal receives and processes the downlink unsteered MIMO pilot and estimates the downlink channel quality, which may be quantified as described below (block 216). The user terminal then sends feedback information indicative of the downlink channel quality to the access point (block 218). The user terminal also transmits an uplink (UL) unsteered MIMO pilot, e.g., along with the feedback information (block 220).

The access point receives the uplink unsteered MIMO pilot, estimates the channel response matrix H based on the unsteered MIMO pilot, and decomposes H to obtain eigenvectors V and singular values for the eigenmodes of H (block 222). The access point also processes the uplink unsteered MIMO pilot and estimates the uplink channel quality (block 224). The access point then estimates the SNRs of the eigenmodes based on the estimated uplink channel quality, the singular values, and the feedback information from the user terminal, as described below (block 226). The access point selects the rates for the eigenmodes based on the estimated SNRs of the eigenmodes (block 228). The access point then processes (e.g., encodes and modulates) data based on the selected rates to obtain data symbols (block 230). The access point performs spatial processing on the data symbols with the eigenvectors V, e.g., as shown in equation (3), and transmits steered data and a downlink steered MIMO pilot on the eigenmodes to the user terminal (block 232). The access point informs the user terminal of the rates used for the current downlink data transmission.

The user terminal receives the downlink steered MIMO pilot and estimates the effective channel response matrix $H_{eff}$ (block 234). The user terminal then performs receiver spatial processing on the downlink data transmission with $H_{eff}$, e.g., as shown in equations (5) through (8) (block 236). The user terminal processes (e.g., demodulates and decodes) the detected data symbols based on the rates selected by the access point to obtain decoded data (block 238).

Figure 3:
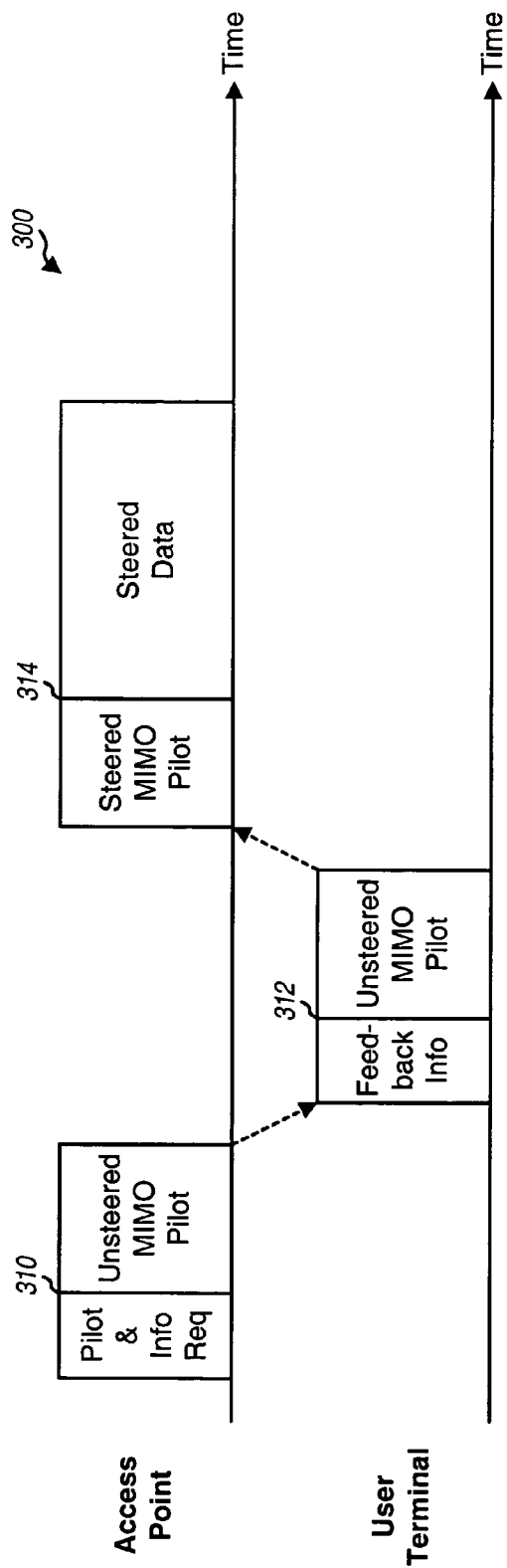
FIGS. 3 and 4 show two schemes for AP-initiated data transmission on eigenmodes with low overhead.

FIG. 3 shows an improved pilot and data transmission scheme 300 that may be used for process 200 in FIG. 2. For scheme 300, the access point sends a request for pilot and feedback information and a downlink unsteered MIMO pilot in a first overhead transmission (block 310). The first overhead transmission may be, e.g., an Initiator Aggregate Control (IAC) message with the training request (TRQ) and MCS request (MRQ) fields being set (or IAC+TRQ+MRQ). The user terminal sends an uplink unsteered MIMO pilot and feedback information in a second overhead transmission (block 312). The second overhead transmission may be, e.g., a Responder Aggregate Control (RAC) message with an MCS feedback field (MFB) being set and further including a sounding packet (or RAC+MFB+sounding packet). The access point then transmits a steered MIMO pilot and steered data to the user terminal (block 314).

Transmission scheme 300 allows the access point to transmit data at the proper rates on the eigenmodes of H using only two overhead transmissions. Comparing scheme 300 in FIG. 3 to scheme 100 in FIG. 1, blocks 110 and 114 in FIG. 1 are essentially combined into block 310 in FIG. 3, and blocks 112 and 116 in FIG. 1 are essentially combined into block 312 in FIG. 3. The major difference between the two schemes is that the user terminal sends back (1) the rates for the eigenmodes in block 116 (since a steered MIMO pilot is available) and (2) feedback information for the downlink MIMO channel in block 312 (since an unsteered MIMO pilot is available). For scheme 300, the access point performs additional processing to select the rates for data transmission on the eigenmodes of the downlink.

In block 214 in FIG. 2 and block 310 in FIG. 3, the access point sends T pilot transmissions from T AP antennas for the downlink unsteered MIMO pilot. The user terminal may estimate the SNR for each AP antenna based on the pilot transmission received from that AP antenna. The SNRs for the T AP antennas are called downlink SNRs and are denoted as $SNR_{dl,i}$ for i=1, . . . , T.

The user terminal may send the feedback information in various forms. In an embodiment, the feedback information comprises quantized values of the downlink SNRs. In another embodiment, the user terminal derives an average downlink SNR as follows:

$$SNR_{dl} = \frac{1}{T} \cdot \sum_{i=1}^{T} SNR_{dl,i}. \quad \text{Eq (15)}$$

The feedback information then comprises a quantized value of $SNR_{dl}$. The downlink SNRs and the average downlink SNR are different forms of an SNR estimate for the downlink.

In yet another embodiment, the user terminal selects a set of rates based on the downlink SNRs. The feedback information comprises the selected rates, which may be viewed as coarse quantized values of the downlink SNRs. In yet another embodiment, the user terminal selects a single rate based on the average downlink SNR, and the feedback information comprises the selected rate. In yet another embodiment, the user terminal selects a rate combination based on the downlink SNRs, and the feedback information comprises the selected rate combination. In yet another embodiment, the feedback information comprises an overall throughput for the selected rates or the selected rate combination. In yet another embodiment, the feedback information comprises a noise floor or noise variance $\sigma_{noise}^2$ observed at the user terminal.

In yet another embodiment, the feedback information comprises acknowledgments (ACKs) and/or negative acknowledgments (NAKs) sent by the user terminal for data packets received from the access point. The access point may maintain a power control loop that adjusts a target SNR for the user terminal based on the received ACKs/NAKs. The access point may use the target SNR to select the appropriate rates for downlink transmission, as described below.

In general, the feedback information may comprise any type of information that is indicative of the downlink channel quality. The feedback information may comprise information sent by one or more layers such as a physical layer, a link layer, and so on.

The feedback information may be sent in various manners. In an embodiment, the feedback information is sent in a message having the proper format and fields. This message may be a control message at the link layer and may be sent whenever there is feedback information to send. In another embodiment, the feedback information is sent in one or more designated fields of a frame or packet, e.g., at the physical layer. The designated fields may be available in each frame or packet that is transmitted and may be set whenever there is feedback information to send.

The access point may select the rates for the eigenmodes in various manners, e.g., depending on the type of feedback information received from the user terminal. To simplify the rate selection by the access point, the noise and interference at the user terminal may be assumed to be approximately constant across spatial dimension, and the noise and interference at the access point may also be assumed to be approximately constant across spatial dimension.

In an embodiment, the SNRs of the eigenmodes are estimated as follows:

$$SNR_{fcsi,dl,m} = SNR_{fcsi,ul,m} - (SNR_{ul} - SNR_{dl}), \quad \text{Eq (16)}$$

where $SNR_{dl}$ is an SNR estimate for the downlink;
$SNR_{ul}$ is an SNR estimate for the uplink;
$SNR_{fcsi,ul,m}$ is the SNR of eigenmode m on the uplink; and
$SNR_{fcsi,dl,m}$ is an estimate of the SNR of eigenmode m on the downlink.

The SNRs in equation (16) are all in units of dB. The access point may obtain $SNR_{dl}$ based on the feedback information from the user terminal and may obtain $SNR_{ul}$ based on the uplink unsteered MIMO pilot. The access point may obtain $SNR_{fcsi,ul,m}$ for each eigenmode by (1) decomposing H to obtain the singular values of H and (2) computing $SNR_{fcsi,ul,m}$ for m=1, ... S, e.g., as shown in equation (9), where $\sigma_{noise}^2$ is the noise variance at the access point.

In another embodiment, the SNRs of the eigenmodes are estimated as follows:

$$SNR_{fcsi,dl,m} = SNR_{fcsi,ul,m} - (SNR_{ul} - SNR_{dl}) - SNR_{bo}, \quad \text{Eq (17)}$$

where $SNR_{bo}$ is a back-off factor used to account for estimation errors. The back-off factor may be selected based on various considerations such as, e.g., the type of feedback information (e.g., SNRs or rates) sent by the user terminal, the age of the feedback information, and so on.

In another embodiment, the feedback information comprises one or more rates selected by the user terminal. The access point may convert the rates to SNRs and then compute an average downlink SNR based on the converted SNRs, as shown in equation (15). The access point may then use the average downlink SNR to estimate the SNRs of the eigenmodes, e.g., as shown in equation (16) or (17). In yet another embodiment, the feedback information comprises an overall throughput for the downlink. The access point may convert the overall throughput to an overall downlink SNR. The access point may also derive an overall uplink SNR and may use the overall downlink and uplink SNRs to estimate the SNRs of the eigenmodes.

In yet another embodiment, the SNRs of the eigenmodes are estimated as follows:

$$SNR_{fcsi,dl,m} = SNR_{fcsi,ul,m} + ASYM(AP, UT), \quad \text{Eq (18)}$$

where ASYM (AP, UT) is an asymmetric parameter that indicates the difference in received SNR at the user terminal when the access point transmits at a known power level on a known channel to the user terminal. For example, the access point may be equipped with four antennas, transmit at 17 dBm, and have a noise figure of 6 dB. The user terminal may be equipped with two antennas, transmit at 10 dBm, and have a noise figure of 10 dB. The RSL observed at the user terminal when the access point transmits at full power on a lossless channel may be computed as:

$$RSL(AP \to UT) = 17 \text{ dBm} - 10 \text{ dB} - 10 \log_{10}(2) = 10 \text{ dBm}. \quad \text{Eq (19)}$$

The RSL observed at the access point when the user terminal transmits at full power on a lossless channel may be computed as:

$$RSL(UT \to AP) = 14 \text{ dBm} - 6 \text{ dB} - 10 \log_{10}(4) = 14 \text{ dBm}. \quad \text{Eq (20)}$$

The asymmetric parameter ASYM (AP, UT) may then be computed as:

$$ASYM(AP, UT) = RSL(AP \to UT) - RSL(UT \to AP) = -4 \text{ dBm}. \quad \text{Eq (21)}$$

The asymmetric parameter may also be determined based on the received SNRs at the access point and the user terminal, as follows:

$$ASYM(AP, UT) = SNR_{ut} - SNR_{ap}, \quad \text{Eq (22)}$$

where $SNR_{ap}$ is an SNR estimate for the uplink, and
$SNR_{ut}$ is an SNR estimate for the downlink.

The access point may obtain $SNR_{ap}$ based on an unsteered MIMO pilot received from the user terminal. The access point may derive $SNR_{ut}$ based on feedback information (e.g., SNR, rate, ACK/NAK, and so on) sent by the user terminal. For example, $SNR_{ut}$ may be a target SNR that is adjusted based on ACKs/NAKs received from the user terminal.

In general, the SNRs of the eigenmodes may be estimated in various manners based on the feedback information and the uplink unsteered MIMO pilot received from the user terminal. The access point selects the rates for the eigenmodes based on the SNRs of the eigenmodes. The access point may select a rate for each eigenmode based on the SNR of that eigenmode. The access point may also select a rate combination based on the SNRs of all eigenmodes.

For scheme 300 in FIG. 3, the user terminal transmits an unsteered MIMO pilot and feedback information in a single overhead transmission. The user terminal may also send the pilot and feedback information separately.

Figure 4:
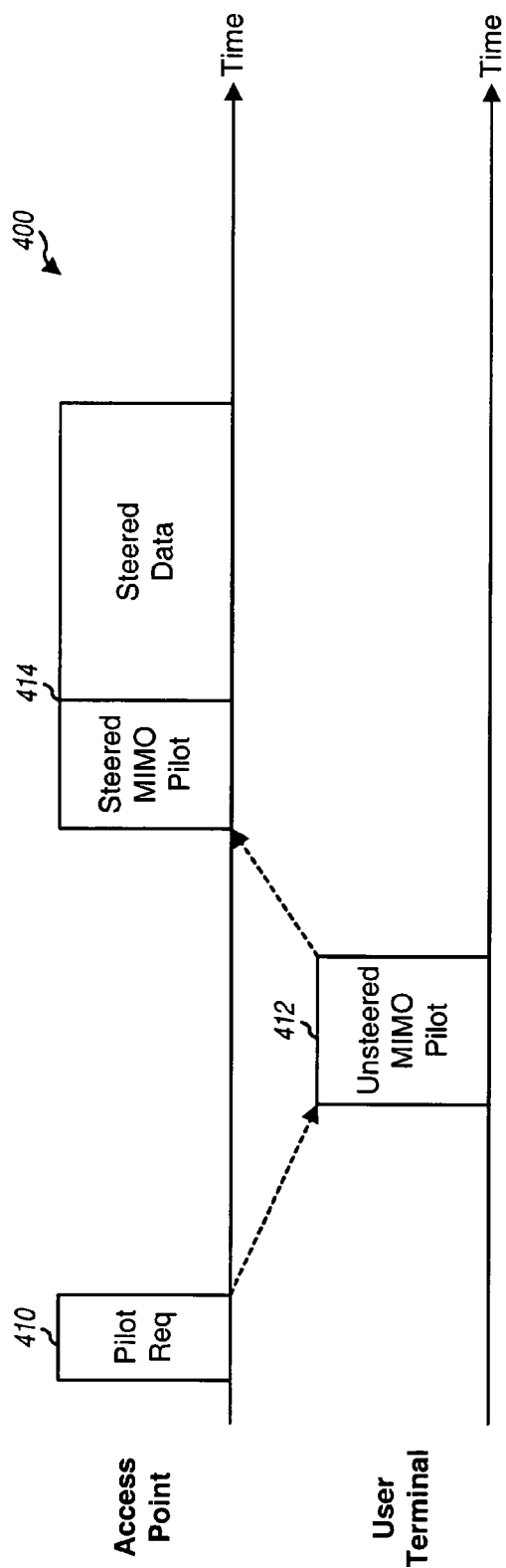

FIG. 4 shows another pilot and data transmission scheme 400 for eigensteering on the downlink with low overhead. Scheme 400 may be used for a scenario in which the access point already has feedback information from the user terminal, e.g., from a prior data transmission to the user terminal. For scheme 400, the access point sends a request for pilot (block 410). The user terminal receives the pilot request and, in response, transmits an uplink unsteered MIMO pilot (block 412). The access point estimates the channel response matrix H based on the uplink unsteered MIMO pilot, decomposes H to obtain the eigenvectors and singular values, and derives an uplink SNR estimate based on the uplink unsteered MIMO pilot. The access point selects the rates for the eigenmodes based on the singular values, the uplink SNR estimate, and the feedback information already available at the access point. The access point may use an appropriate back-off factor in equation (17) to account for the age of the feedback information. For example, a progressively larger back-off factor may be used for progressively older feedback information. The access point then transmits a steered MIMO pilot and steered data to the user terminal (block 414).

Schemes 100, 300 and 400 are for downlink data transmission initiated by the access point. Data transmission on the downlink may also be initiated by the user terminal.

Figure 5:
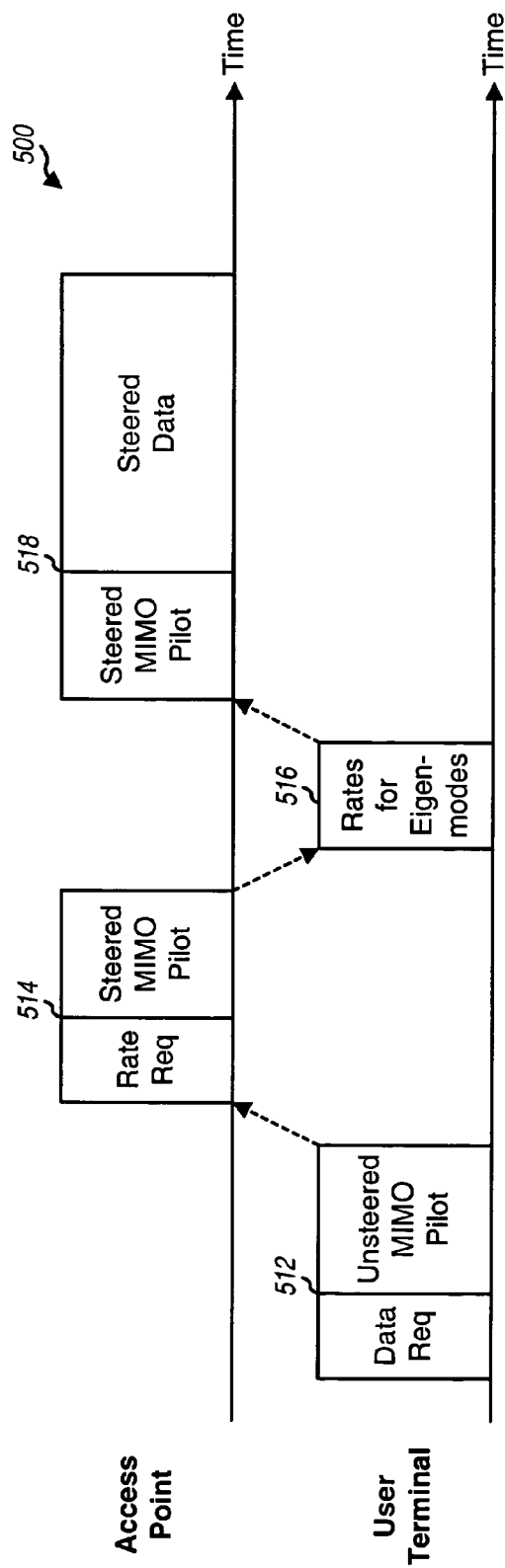
FIG. 5 shows a scheme for UT-initiated data transmission on eigenmodes.

FIG. 5 shows a pilot and data transmission scheme 500 for UT-initiated steered data transmission on the downlink. For scheme 500, the user terminal sends a request for downlink data transmission and an uplink unsteered MIMO pilot (block 512). The access point derives eigenvectors based on the uplink unsteered MIMO pilot, sends a request for pilot and rate information, and transmits a downlink steered MIMO pilot (block 514). The user terminal estimates the SNRs of the eigenmodes based on the downlink steered MIMO pilot, selects the rates for the eigenmodes based on the SNRs of the eigenmodes, and sends the selected rates (block 516). The access point processes data based on the rates selected by the user terminal and transmits a downlink steered MIMO pilot and steered data to the user terminal (block 518). Scheme 500 in FIG. 5 is similar to scheme 100 in FIG. 1, except that the downlink data transmission is initiated by a data request sent by the user terminal in scheme 500 instead of a pilot request sent by the access point in scheme 100. Scheme 500 requires three overhead transmissions to support eigensteering on the downlink.

Figure 6:
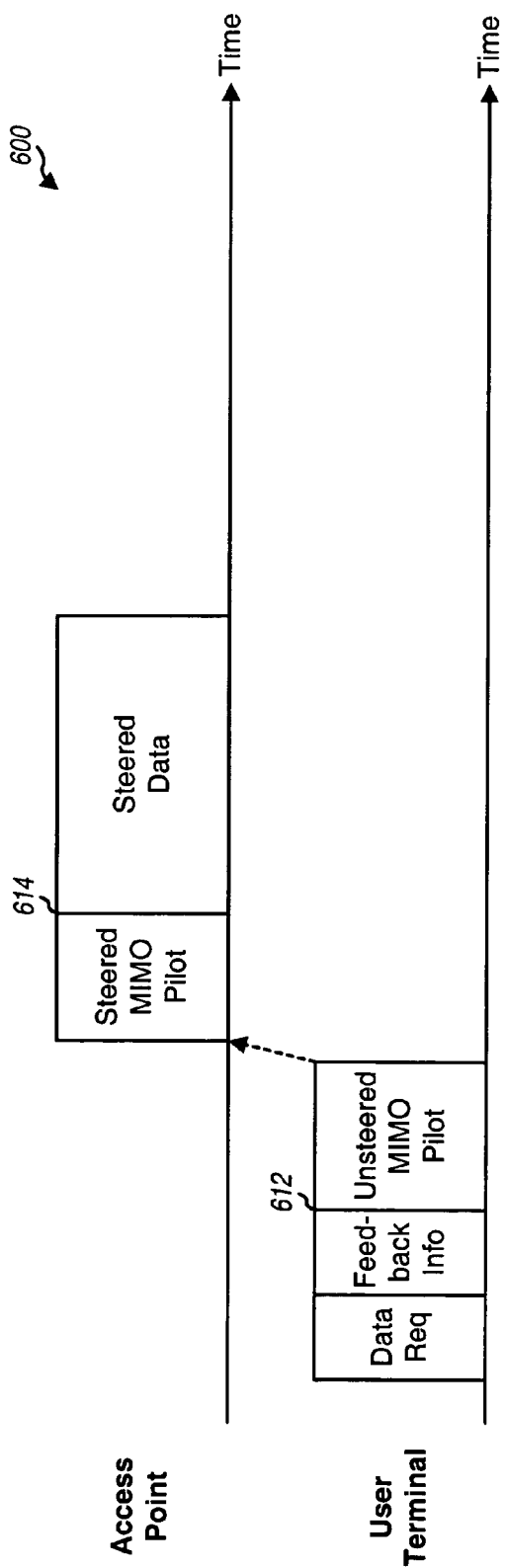
FIG. 6 shows a scheme for UT-initiated data transmission on eigenmodes with low overhead.

FIG. 6 shows an improved pilot and data transmission scheme 600 for UT-initiated steered data transmission on the downlink with low overhead. For scheme 600, the user terminal sends a request for downlink data transmission, an uplink unsteered MIMO pilot, and possibly feedback information (block 612). The feedback information may comprise (1) the noise floor or noise variance $\sigma_{noise}^2$ observed by the user terminal, (2) SNRs of the eigenmodes estimated in a prior downlink data transmission, or (3) some other information indicative of the downlink channel quality. The access point derives eigenvectors and singular values based on the uplink unsteered MIMO pilot and selects the rates for the eigenmodes based on the uplink unsteered MIMO pilot and the feedback information. The access point then processes data based on the selected rates and transmits a downlink steered MIMO pilot and steered data to the user terminal (block 614). Scheme 600 requires a single overhead transmission to support eigensteering on the downlink.

The rate selection techniques may be used for downlink data transmission from the access point to the user terminal, as described above. These techniques may also be used for uplink data transmission from the user terminal to the access point and for peer-to-peer data transmission, e.g., from one user terminal to another user terminal. In general, the transmitting station may be an access point or a user terminal, and the receiving station may also be an access point or a user terminal. Using the techniques described herein, only the transmitting station needs to perform decomposition, and low overhead is required for eigensteering.

Figure 7:
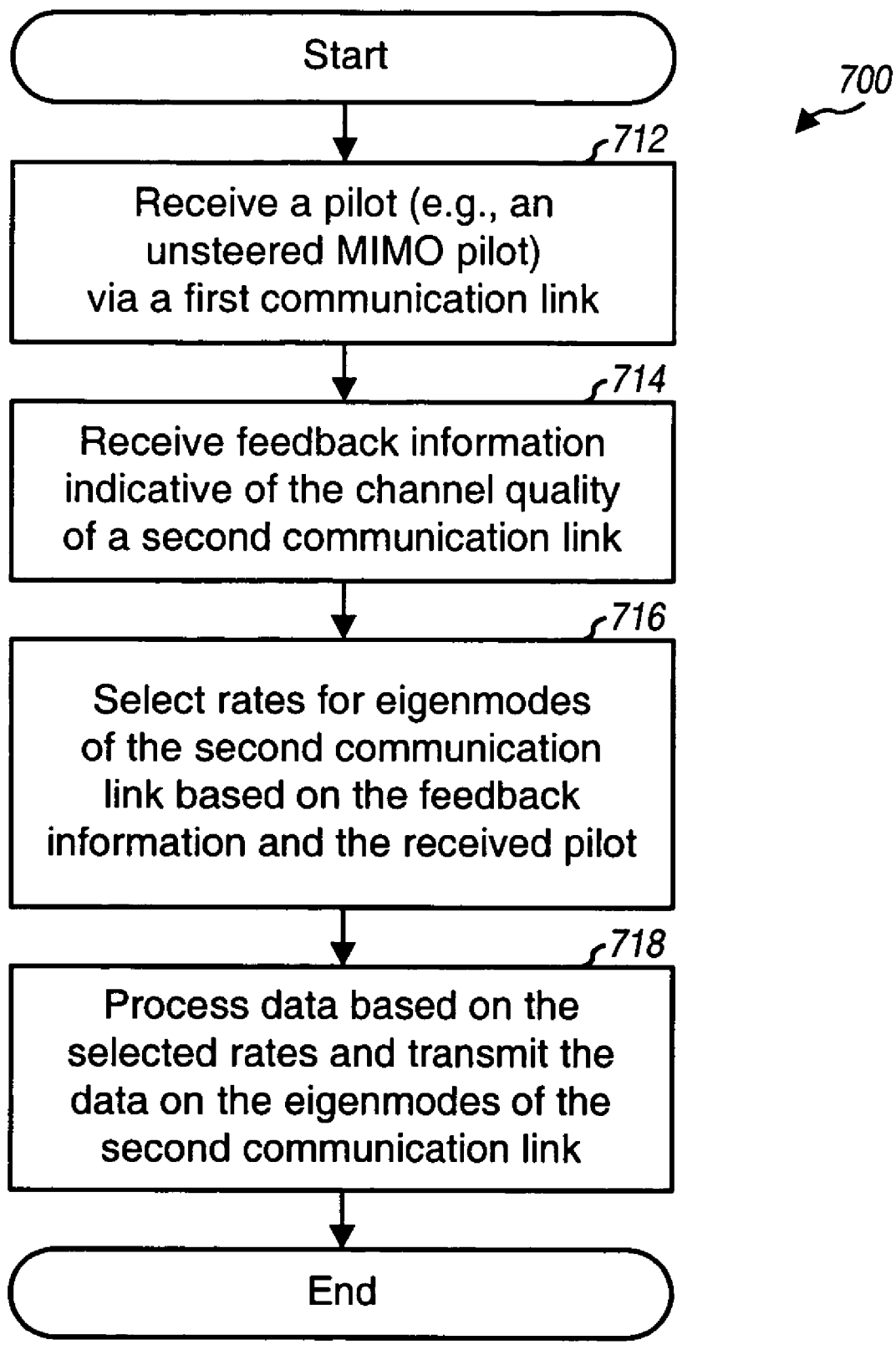
FIG. 7 shows a process for transmitting data on eigenmodes with low overhead.

FIG. 7 shows a process 700 for transmitting data on eigenmodes with low overhead. A pilot (e.g., an unsteered MIMO pilot) is received via a first communication link (e.g., the uplink) (block 712). Feedback information indicative of the channel quality of a second communication link (e.g., the downlink) is also received (block 714). The pilot and feedback information may be received from a single transmission or multiple transmissions. The pilot and feedback information may be sent in response to a request for pilot and feedback information, as shown in FIG. 3, or may be sent along with a data request, as shown in FIG. 6. The feedback information may be derived based on a pilot transmitted via the second communication link, as shown in FIG. 3. In any case, the rates for the eigenmodes of the second communication link are selected based on the feedback information and the pilot received via the first communication link, e.g., as described above for process 200 in FIG. 2 (block 716). Data is processed based on the selected rates and transmitted on the eigenmodes of the second communication link (block 718).

The rate selection techniques described herein may be used for single-carrier and multi-carrier MIMO systems. Multiple carriers may be provided by orthogonal frequency division multiplexing (OFDM) or some other constructs. OFDM effectively partitions the overall system bandwidth into multiple (K) orthogonal subbands, which are also called tones, subcarriers, bins, and frequency channels. With OFDM, each subband is associated with a respective subcarrier that may be modulated with data.

For a MIMO system that utilizes OFDM, a channel response matrix H(k) may be obtained for each subband k and decomposed to obtain the eigenmodes of that subband. The singular values in each diagonal matrix $\Sigma(k)$, for k=1, ..., K, may be ordered such that the first column contains the largest singular value, the second column contains the next largest singular value, and so on, or $\sigma_1(k) \geq \sigma_2(k) \geq ... \geq \sigma_s(k)$, where $\sigma_m(k)$ is the singular value in the m-th column of $\Sigma(k)$ after the ordering. When the singular values in each matrix $\Sigma(k)$ are ordered, the eigenvectors (or columns) of the matrix V(k) for that subband are also ordered correspondingly. A wideband eigenmode may be defined as the set of same-order eigenmode of all K subbands after the ordering, e.g., wideband eigenmode m includes eigenmode m of all K subbands. Each wideband eigenmode is associated with a set of K eigenvectors for the K subbands. The rate selection may be performed for the S wideband eigenmodes, e.g., similar to that described above for a single-carrier MIMO system.

Figure 8:
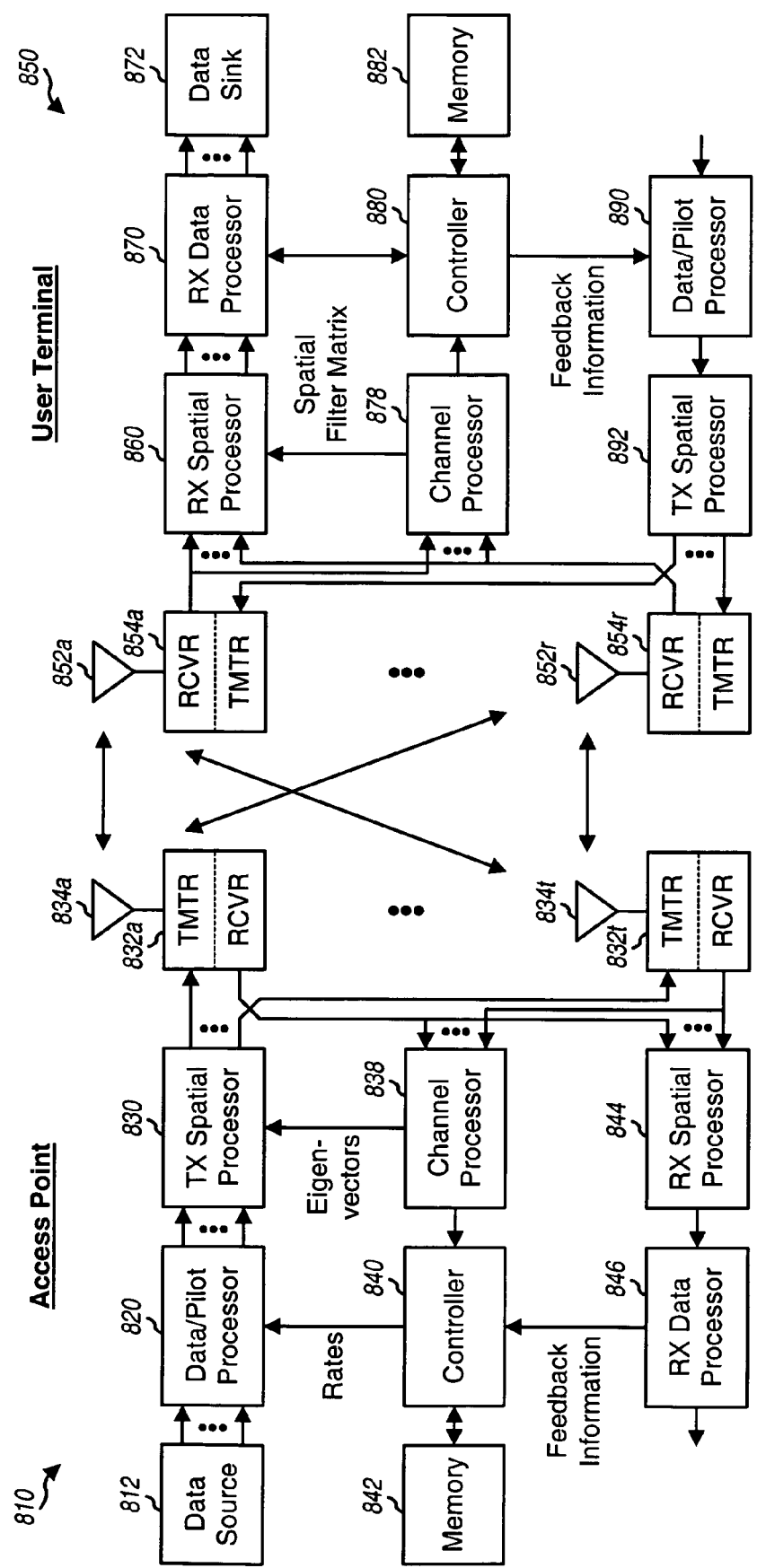
FIG. 8 shows a block diagram of an access point and a user terminal.

FIG. 8 shows a block diagram of an access point 810 and a user terminal 850. At access point 810, a data/pilot processor 820 receives traffic data from a data source 812, processes (e.g., encodes, interleaves, and modulates) the traffic data, and provides data symbols. One data stream may be sent on each eigenmode, and each data stream may be encoded and modulated based on the rate selected for that stream/eigenmode. Processor 820 also generates pilot symbols for unsteered and steered MIMO pilots. A transmit (TX) spatial processor 830 performs spatial processing on the data and pilot symbols with eigenvectors and provides T streams of transmit symbols to T transmitter units (TMTR) 832a through 832t. Each transmitter unit 832 conditions a respective transmit symbol stream and generates a corresponding modulated signal. T modulated signals from transmitter units 832a through 832t are transmitted from T antennas 834a through 834t, respectively.

At user terminal 850, R antennas 852a through 852r receive the modulated signals transmitted by access point 810, and each antenna provides a received signal to a respective receiver unit (RCVR) 854. Each receiver unit 854 performs processing complementary to that performed by transmitter units 832 and provides received symbols. A receive (RX) spatial processor 860 performs spatial matched filtering on the received symbols from all R receiver units 854 based on a spatial filter matrix and provides detected data symbols. An RX data processor 870 processes (e.g., demodulates, deinterleaves, and decodes) the detected data symbols and provides decoded data.

Controllers 840 and 880 control the operation of various processing units at access point 810 and user terminal 850, respectively. Memory units 842 and 882 store data and program codes used by controllers 840 and 880, respectively.

For rate selection, a channel processor 878 estimates the downlink channel quality and provides a downlink channel quality estimate. Controller 880 provides feedback information indicative of the downlink channel quality. The feedback information and pilot symbols for an unsteered MIMO pilot are processed by a data/pilot processor 890 and a TX spatial processor 892 to generate R transmit symbol streams. R transmitter units 854a through 854r condition the R transmit symbol streams and generate R modulated signals, which are sent via R antennas 852a through 852r.

At access point 810, the modulated signals from user terminal 850 are received by T antennas 834 and processed by T receiver units 832 to obtain received symbols. The received symbols are further processed by an RX spatial processor 844 and an RX data processor 842 to obtain the feedback information from user terminal 850. A channel processor 838 receives the unsteered MIMO pilot from user terminal 850 and derives a channel estimate for the uplink. The channel estimate may comprise a channel response matrix H and an uplink channel quality estimate. Channel processor 838 decomposes H to obtain eigenvectors and singular values for the eigenmodes of H and provides the eigenvectors to TX spatial processor 830. Controller 840 receives the uplink channel quality estimate and the singular values from channel processor 838 and the feedback information from RX data processor 846, estimates the SNRs of the eigenmodes, selects the rates for the eigenmodes, and provides the selected rates to TX data processor 820.

The processing to transmit data on eigenmodes of the uplink MIMO channel may be performed in a manner similar to that described above for the downlink.

The rate selection techniques described herein may be implemented by various means. For example, these techniques may be implemented in hardware, software, or a combination thereof. For a hardware implementation, the various units at the access point may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. The various units at the user terminal may also be implemented within one or more ASICs, DSPs, processors, and so on.

For a software implementation, the techniques may be implemented with modules (e.g., procedures, functions, and so on) that perform the functions described herein. The software codes may be stored in a memory unit (e.g., memory unit 842 or 882 in FIG. 8) and executed by a processor (e.g., controller 840 or 880). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
    a channel processor to receive a first pilot via a first communication link and to derive a channel estimate for the first communication link, wherein the channel processor estimates channel quality of the first communication link based on the first pilot; and
    a controller to receive feedback information indicative of channel quality of a second communication link and to select rates for eigenmodes of the second communication link based on the feedback information and the channel estimate, wherein the controller estimates signal-to-noise-and-interference ratios (SNRs) of the eigenmodes based on the estimated channel quality of the first communication link and the feedback information and further selects the rates for the eigenmodes based on the SNRs of the eigenmodes.

2. The apparatus of claim 1, wherein the controller sends a request for pilot and feedback information, and wherein the first pilot and the feedback information are sent in response to the request.

3. The apparatus of claim 1, further comprising:
    a pilot processor to generate a second pilot for transmission via the second communication link, and wherein the feedback information is derived based on the second pilot.

4. The apparatus of claim 1, wherein the channel processor obtains a channel response matrix and an SNR estimate for the first communication link based on the first pilot and decomposes the channel response matrix to obtain channel gains for the eigenmodes, and wherein the controller estimates the SNRs of the eigenmodes based on the channel gains for the eigenmodes, the SNR estimate for the first communication link, and the feedback information.

5. The apparatus of claim 1, wherein the controller selects a rate for each eigenmode based on an SNR of the eigenmode.

6. The apparatus of claim 1, wherein the controller selects a rate combination for the eigenmodes based on the SNRs of the eigenmodes.

7. The apparatus of claim 1, wherein the feedback information comprises a signal-to-noise-and-interference ratio (SNR) estimate for the second communication link.

8. The apparatus of claim 1, wherein the feedback information comprises at least one rate or an overall throughput for the second communication link.

9. The apparatus of claim 1, wherein the feedback information comprises acknowledgments or negative acknowledgments for data packets.

10. The apparatus of claim 1, wherein the first pilot and the feedback information are received from a single transmission sent via the first communication link.

11. The apparatus of claim 1, wherein the feedback information is received for a prior data transmission sent via the second communication link.

12. The apparatus of claim 1, further comprising:
a data processor to process data based on the rates selected for the eigenmodes; and
a spatial processor to spatially process the data for transmission on the eigenmodes.

13. An apparatus comprising:
a channel processor to receive a first pilot via a first communication link and to derive a channel estimate for the first communication link; and
a controller to receive feedback information indicative of channel quality of a second communication link and to select rates for eigenmodes of the second communication link based on the feedback information and the channel estimate, wherein the first pilot is an unsteered multiple-input multiple-output (MIMO) pilot sent from a first plurality of antennas and received via a second plurality of antennas.

14. A method of performing rate selection by a device in a wireless communications system, comprising:
receiving a first pilot via a first communication link and estimating channel quality of the first communication link based on the first pilot;
receiving feedback information indicative of channel quality of a second communication link;
estimating signal-to-noise-and-interference ratios (SNRs) of eigenmodes of the second communication link based on the estimated channel quality of the first communication link and the feedback information; and
selecting rates for the eigenmodes of the second communication link based on the feedback information and the SNRs of the eigenmodes.

15. The method of claim 14, further comprising:
sending a request for pilot and feedback information, and wherein the first pilot and the feedback information are sent in response to the request.

16. The method of claim 14, further comprising:
transmitting a second pilot via the second communication link, and wherein the feedback information is derived based on the second pilot.

17. The method of claim 14, wherein the estimating the SNRs of the eigenmodes comprises
obtaining a channel response matrix for the first communication link based on the first pilot,
decomposing the channel response matrix to obtain channel gains for the eigenmodes, and
deriving the SNRs of the eigenmodes based on the channel gains for the eigenmodes, the estimated channel quality of the first communication link, and the feedback information.

18. An apparatus comprising:
means for receiving a first pilot via a first communication link and estimating channel quality of the first communication link based on the first pilot;
means for receiving feedback information indicative of channel quality of a second communication link;
means for estimating signal-to-noise-and-interference ratios (SNRs) of eigenmodes of the second communication link based on the estimated channel quality of the first communication link and the feedback information; and
means for selecting rates for the eigenmodes of the second communication link based on the feedback information and the SNRs of the eigenmodes.

19. The apparatus of claim 18, further comprising:
means for sending a request for pilot and feedback information, and wherein the first pilot and the feedback information are sent in response to the request.

20. The apparatus of claim 18, further comprising:
means for transmitting a second pilot via the second communication link, and wherein the feedback information is derived based on the second pilot.

21. The apparatus of claim 18, wherein the means for estimating the SNRs of the eigenmodes comprises
means for obtaining a channel response matrix for the first communication link based on the first pilot,
means for decomposing the channel response matrix to obtain channel gains for the eigenmodes, and
means for deriving the SNRs of the eigenmodes based on the channel gains for the eigenmodes, the estimated channel quality of the first communication link, and the feedback information.

22. A method of performing rate selection in a multiple-input multiple-output (MIMO) communication system, comprising:
transmitting a first unsteered MIMO pilot via a downlink;
receiving a second unsteered MIMO pilot and feedback information via an uplink, wherein the feedback information is indicative of downlink channel quality estimated based on the first unsteered MIMO pilot; and
selecting rates for eigenmodes of the downlink based on the feedback information and the second unsteered MIMO pilot.

23. The method of claim 22, wherein the selecting the rates for the eigenmodes of the downlink comprises
estimating uplink channel quality based on the second unsteered MIMO pilot,
obtaining a channel response matrix for the uplink based on the second unsteered MIMO pilot,
decomposing the channel response matrix to obtain channel gains for the eigenmodes,
estimating signal-to-noise-and-interference ratios (SNRs) of the eigenmodes based on the estimated uplink channel quality, the channel gains for the eigenmodes, and the feedback information, and
selecting the rates for the eigenmodes based on the SNRs of the eigenmodes.

24. An apparatus comprising:
a pilot processor to generate a first pilot for transmission via a first communication link;
a controller to send feedback information indicative of channel quality of a second communication link; and
a spatial processor to receive a data transmission on eigenmodes of the second communication link, wherein the data transmission is sent at rates selected based on the first pilot and the feedback information, wherein the pilot processor generates the first pilot as an unsteered multiple-input multiple-output (MIMO) pilot suitable for transmission from a plurality of antennas.

25. The apparatus of claim 24, wherein the controller receives a request for pilot and feedback information and sends the first pilot and the feedback information in response to the request.

26. The apparatus of claim 24, further comprising:
a channel processor to receive a second pilot via the second communication link and to derive a signal-to-noise-and-interference ratio (SNR) estimate for the second communication link based on the second pilot, and wherein the controller generates the feedback information based on the SNR estimate.

27. A method of performing rate selection, comprising:
transmitting a first pilot via a first communication link;
sending feedback information indicative of channel quality of a second communication link; and
receiving a data transmission on eigenmodes of the second communication link, wherein the data transmission is sent at rates selected based on the first pilot and the feedback information, wherein the first pilot is generated as an unsteered multiple-input multiple-output (MIMO) pilot suitable for transmission from a plurality of antennas.

28. The method of claim 27, further comprising:
receiving a request for pilot and feedback information, and wherein the first pilot and the feedback information are sent in response to the request.

29. The method of claim 27, further comprising:
receiving a second pilot via the second communication link;
deriving a signal-to-noise-and-interference ratio (SNR) estimate for the second communication link based on the second pilot; and
generating the feedback information based on the SNR estimate.

30. An apparatus comprising:
means for transmitting a first pilot via a first communication link;
means for sending feedback information indicative of channel quality of a second communication link; and
means for receiving a data transmission on eigenmodes of the second communication link, wherein the data transmission is sent at rates selected based on the first pilot and the feedback information;
wherein the means for transmitting generates the first pilot as an unsteered multiple-input multiple-output (MIMO) pilot suitable for transmission from a plurality of antennas.

31. The apparatus of claim 30, further comprising:
means for receiving a request for pilot and feedback information, and wherein the first pilot and the feedback information are sent in response to the request.

32. The apparatus of claim 30, further comprising:
means for receiving a second pilot via the second communication link;
means for deriving a signal-to-noise-and-interference ratio (SNR) estimate for the second communication link based on the second pilot; and
means for generating the feedback information based on the SNR estimate.

\* \* \* \* \*